IMAGE US012041472B2

(12) United States Patent
Harada et al.

(10) Patent No.: US 12,041,472 B2
(45) Date of Patent: Jul. 16, 2024

(54) USER TERMINAL AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 94 days.

(21) Appl. No.: 16/623,979

(22) PCT Filed: Jun. 21, 2017

(86) PCT No.: PCT/JP2017/022913
§ 371 (c)(1),
(2) Date: Dec. 18, 2019

(87) PCT Pub. No.: WO2018/235208
PCT Pub. Date: Dec. 27, 2018

(65) Prior Publication Data
US 2020/0145854 A1    May 7, 2020

(51) Int. Cl.
*H04W 24/08* (2009.01)
*H04B 17/309* (2015.01)

(52) U.S. Cl.
CPC .......... *H04W 24/08* (2013.01); *H04B 17/309* (2015.01)

(58) Field of Classification Search
CPC ..................................................... H04W 24/08
See application file for complete search history.

(56) References Cited

U.S. PATENT DOCUMENTS

| | | | | |
|---|---|---|---|---|
| 2018/0206272 | A1* | 7/2018 | Maaref | H04L 5/0053 |
| 2019/0268813 | A1* | 8/2019 | Ramachandra | H04W 36/0088 |
| 2019/0363809 | A1* | 11/2019 | Yoon | H04W 56/001 |
| 2019/0364452 | A1* | 11/2019 | Hwang | H04W 56/00 |
| 2020/0120530 | A1* | 4/2020 | Luo | H04W 24/02 |
| 2021/0144601 | A1* | 5/2021 | Kazmi | H04W 36/0088 |

OTHER PUBLICATIONS

Office Action in counterpart Japanese Patent Application No. 2019-524785 issued on Feb. 9, 2021 (4 pages).
3GPP TSG-RAN WG1#88; R1-1703097 "DL Signals for Mobility Measurements in NR and Mobility schemes" Nokia, Alcatel-Lucent Shanghai Bell; Athens, Greece; Feb. 13-17, 2017 (12 page).
3GPP TSG RAN WG1 Meeting Ad-hoc#2; R1-1710514 "SS Block based RRM measurements" Intel Corporation; Qingdao, P.R. China; Jun. 27-30, 2017 (3 pages).

(Continued)

*Primary Examiner* — Abdeltif Ajid
(74) *Attorney, Agent, or Firm* — Osha Bergman Watanabe & Burton LLP

(57) ABSTRACT

A terminal is disclosed including a receiver that receives information indicating at least one of synchronization signal (SS) blocks for measurement in a measurement duration, and a processor that measures, using the at least one of SS blocks indicated by the information, at least one of a reference signal received power (RSRP), a reference signal received quality (RSRQ), and a signal to interference plus noise ratio (SINR). In other aspects, a radio communication method for a terminal is also disclosed.

10 Claims, 13 Drawing Sheets

(56) References Cited

OTHER PUBLICATIONS

3GPP TSG-RAN WG1 NR Adhoc #2; R1-1711268 "SS Block Measurements and Procedures" Nokia, Alcatel-Lucent Shanghai Bell; Qingdao, China; Jun. 27-30, 2017 (5 pages).
3GPP TSG RAN WG1 Meeting #89; R1-1708445 "Discussion on NR RRM measurement based on CSI-RS for L3 mobility" NTT Docomo, Inc .; Hangzhou, P.R. China; May 15-19, 2017 (10 pages).
Extended European Search Report issued in European Application No. 17914265.8, dated Nov. 27, 2020 (14 pages).
Office Action issued in the counterpart Japanese Patent Application No. 2019-524785, mailed on Jun. 2, 2020 (8 pages).
LG Electronics; "Discussion on DL beam management"; 3GPP TSG RAN WG1 Meeting #89, R1-1707604; Hangzhou, China; May 15-19, 2017 (7 pages).
NTT Docomo, Inc .; "Discussion on remaining details on multiple SS block transmissions in wideband CC for NR"; 3GPP TSG RAN WG1 NR Ad-Hoc#2, R1-1711059; Qingdao, P.R. China; Jun. 27-30, 2017 (4 pages).
Office Action issued in the counterpart Japanese Patent Application No. 2019-524785, mailed on Sep. 23, 2020 (6 pages).
International Search Report issued in PCT/JP2017/022913 mailed on Aug. 15, 2017 (2 pages).
Written Opinion of the International Searching Authority issued in PCT/JP2017/022913 mailed on Aug. 15, 2017 (4 pages).
Mediatek et al.; "WF on RRM measurement"; 3GPP TSG RAN WG1 Meeting #89, R1-1709810; Hangzhou, P.R. China; May 15-19, 2017 (5 pages).
Intel Corporation; "SS block composition"; 3GPP TSG RAN WG1 Meeting RAN1 #89, R1-1707337; Hangzhou, P.R. China; May 15-19, 2017 (8 pages).
LG Electronics; "Discussion on SS block composition and SS burst set composition"; 3GPP TSG RAN WG1 Meeting #89, R1-1707588; Hangzhou, P.R. China; May 15-19, 2017 (9 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
Office Action issued in Japanese Application No. 2020-211208; Dated Jan. 25, 2022 (6 pages).
Office Action issued in Indian Application No. 201937051872; Dated Feb. 4, 2022 (7 pages).
Office Action in counterpart European Patent Application No. 17 914 265.8 issued on May 30, 2022 (11 pages).
Nokia et al.; "SS block time index indication"; 3GPP TSG-RAN1 WG1 Meeting #89, R1-1708233; Hangzhou, China; May 15-19, 2017 (9 pages).
CATT; "SS-block time index indication"; 3GPP TSG RAN WG1 NR Ad Hoc #2, R1-1710024; Qingdao, China; Jun. 27, 30, 2017 (3 pages).
Ericsson; "Mobility measurements based on SS block"; 3GPP TSG-RAN WG1 NR Ad Hoc #2, R1-1711384; Qingdao, China; Jun. 27-30, 2017 (5 pages).
Office Action issued in Israelian Application No. 271566, dated Jul. 10, 2022 (8 pages).
Office Action issued in Indonesian Application No. P00202000497, dated Aug. 29, 2022 (6 pages).
Office Action issued in Chinese Application No. 201780092430.2, dated Jan. 28, 2023 (13 pages).
Office Action issued in counterpart Israeli Patent Application No. 271566 mailed on May 22, 2023 (8 pages).
Office Action in the counterpart Chinese Application No. 201780092430. 2, mailed Oct. 12, 2023 (13 pages).

\* cited by examiner

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and low latency, Long Term Evolution (LTE) has been specified (Non-Patent Literature 1). Furthermore, for the purpose of a large volume and sophistication of LTE (LTE Rel. 8 and 9), LTE-Advanced (LTE-A and LTE Rel. 10, 11, 12 and 13) has been specified.

Successor systems of LTE (e.g., Future Radio Access (FRA), the 5th generation mobile communication system (5G), 5G+(plus), New Radio (NR), New radio access (NX), Future generation radio access (FX) and releases subsequent to LTE Rel. 14 or 15) have been also studied.

In existing LTE systems (e.g., LTE Rel. 8 to 13), a user terminal (UE: User Equipment) detects a synchronization signal (a Primary Synchronization Signal (PSS) and/or a Secondary Synchronization Signal (SSS)) by an initial access procedure (also referred to as cell search), establishes synchronization with a network (e.g., a base station (eNode B (eNB)), and identifies (for example, identifies based on a cell IDentifier (ID)) a cell to connect.

Furthermore, after the cell search, the user terminal receives a Master Information Block (MIB) transmitted on a broadcast channel (PBCH: Physical Broadcast Channel) and a System Information Block (SIB) transmitted on a DownLink (DL) shared channel (PDSCH: Physical Downlink Shared Channel), and obtains configuration information (that may be referred to as broadcast information or system information) for communicating with a network.

CITATION LIST

Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

It is studied for a future radio communication system (e.g., NR or 5G) to define a resource unit including a synchronization signal (also referred to as a PSS and/or an SSS, or an NR-PSS and/or an NR-SSS) and a broadcast channel (also referred to as a PBCH or an NR-PBCH) as a Synchronization Signal (SS) block. Furthermore, it is studied to define a set of one or more SS blocks as an SS burst and repeat an SS burst set that is a set of one or more SS bursts at a predetermined periodicity.

Furthermore, it is also studied for the future radio communication system to measure (also referred to as measurement or Radio Resource Management (RRM) measurement) for measuring at least one of received power (e.g., RSRP: Reference Signal Received Power), received quality (e.g., RSRQ: Reference Signal Received Quality or an SINR: Signal to Interference plus Noise Ratio) and reception strength (e.g., RSSI: Reference Signal Strength Indicator) by using the SS blocks.

On the other hand, it is also assumed that there is an SS block that is not actually transmitted in an SS burst set. Therefore, to efficiently perform measurement by using SS blocks, it is desirable to notify a user terminal of the SS blocks that are actually transmitted in the SS burst set. However, there is a risk that, when the SS blocks that are actually transmitted are notified to the user terminal, a processing load of a network side and/or a signaling overhead increase.

The present invention has been made in light of this problem. One of objects of the present invention is to provide a user terminal and a radio communication method that can efficiently perform measurement while suppressing an increase in a processing load of a network side and/or a signaling overhead.

Solution to Problem

A user terminal according to one aspect of the present invention includes: a reception section that receives synchronization signal (SS) block transmission information indicating an SS block transmitted by a serving cell; and a control section that controls measurement of the serving cell in a measurement period of a predetermined periodicity based on the SS block transmission information.

Advantageous Effects of Invention

According to the present invention, it is possible to efficiently perform measurement while suppressing an increase in a processing load of a network side and/or a signaling overhead.

DESCRIPTION OF EMBODIMENTS

It is studied for future radio communication systems (e.g., LTE. 14, 15 and subsequent releases such as 5G and NR that are also referred to as NR below) define a resource unit including at least a synchronization signal and a broadcast channel as a Synchronization Signal (SS) block, and perform communication (e.g., initial access and/or measurement) by using SS blocks.

The SS block may include at least, for example, a primary synchronization signal (also referred to as a PSS, an NR-PSS, a first synchronization signal or a first synchronization channel) and/or a secondary synchronization signal (also referred to as an SSS, an NR-SSS, a second synchronization signal or a second synchronization channel), and a broadcast channel (also referred to as a PBCH: Physical Broadcast Channel, an NR-PBCH, a broadcast signal, a Mater Information Block (MIB) or system information). In addition, a synchronization signal (e.g., TSS: Tertiary SS) different from the PSS and the SSS may be included in the SS block. The NR-PSS and/or the NR-SSS will be also referred to as an NR-PSS/SSS below.

Furthermore, the SS block includes one or more symbols (e.g., OFDM symbols). More specifically, the SS block may include a plurality of contiguous symbols. In the SS block, the NR-PSS, the NR-SSS and the NR-PBCH may be mapped on one or more different symbols. For example, it may be studied for the SS block to compose the SS block by four symbols including an NR-SSS of one symbol, an NR-SSS of one symbol and an NR-PBCH of two symbols.

FIG. 1 is a diagram illustrating one example of a configuration of an SS block. In addition, although FIGS. 1A to 1D illustrate SS blocks including four symbols, the configuration of the SS block is not illustrated to those illustrated in FIGS. 1A to 1D. For example, the NR-PBCH may be arranged on three or more symbols, and an SS block may include five or more symbols.

Figure 1A:
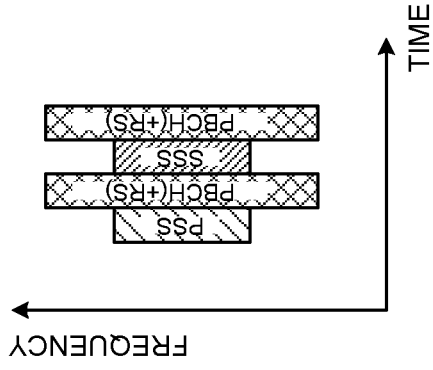
FIGS. 1A to 1D are diagrams illustrating one example of a configuration of an SS block.
Figure 1B:
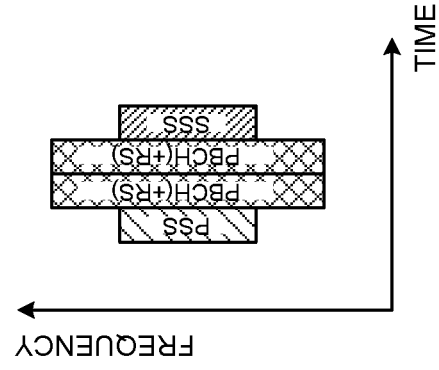
Figure 1C:
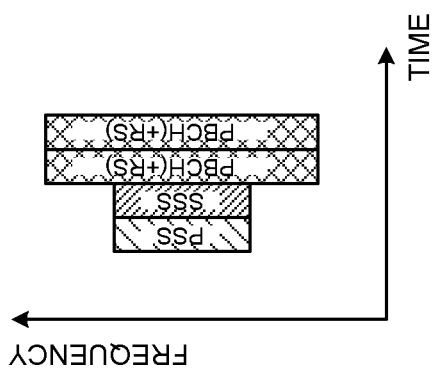
Figure 1D:
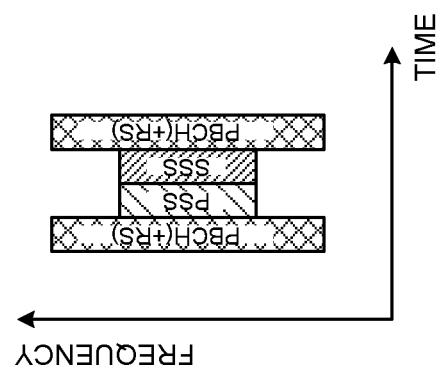

The NR-PBCH may be arranged on two contiguous symbols after the NR-PSS and the NR-SSS (FIG. 1A), or may be arranged on two contiguous symbols between the NR-PSS and the NR-SSS (FIG. 1D). Alternatively, the NR-PBCH may be dispersed and arranged on one symbol after the NR-PSS and one symbol after the NR-SSS (FIG. 1B) or may be dispersed and arranged on one symbol before the NR-PSS and one symbol after the NR-SSS (FIG. 1C).

As illustrated in FIGS. 1A to 1D, the NR-PSS/SSS and the NR-PBCH may be arranged (mapped) in frequency domains (or frequency bands) of different bandwidths (the different numbers of resource blocks). For example, the NR-PSS/SSS may be mapped in a first frequency domain (e.g., 127 sequences (or 127 subcarriers)), and the NR-PBCH may be mapped in a second frequency domain (e.g., 288 subcarriers) wider than the first frequency domain.

Furthermore, a reference signal (referred to as a DeModulation Reference Signal or a DMRS) used to demodulate the NR-PBCH may be mapped in at least part of the second frequency domain. In addition, a frequency domain (e.g., the number of subcarriers) that composes the NR-PSS/SSS and the NR-PBCH is not limited to the above value.

Furthermore, the first frequency domain in which the NR-PSS/SSS is mapped and a second frequency domain in which the NR-PBCH is mapped may be arranged at least partially overlapping each other. For example, the first frequency domain and the second frequency domain may be arranged such that center frequencies of the NR-PSS, the NR-SSS and the NR-PBCH match.

A set of one or a plurality of SS blocks configured as described may be referred to as an SS burst. The SS burst may include SS blocks of contiguous frequency and/or time resources or may include SS blocks of non-contiguous frequency and/or time resources. The SS burst may be configured at a predetermined periodicity (that may be referred to as an SS burst periodicity) or may be configured aperiodically.

Furthermore, one or a plurality of SS bursts may be referred to as an SS burst set (SS burst series). For example, a radio base station (also referred to as a Base Station (BS), a Transmission/Reception Point (TRP), an eNode B (eNB) or a gNode B (gNB)) and/or a user terminal may beam-sweep and transmit the NR-PSS, the NR-SSS and the NR-PBCH (also referred to as an NR-PSS/SSS/PBCH) by using one or more SS bursts included in one SS burst set. In addition, the SS burst set is periodically configured. The UE may control reception processing assuming that the SS burst set is transmitted periodically (at an SS burst set periodicity).

Figure 2A:
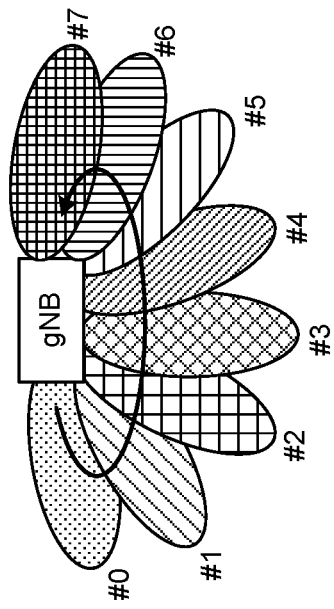
FIGS. 2A and 2B are diagrams illustrating one example of an SS burst set.
Figure 2B:
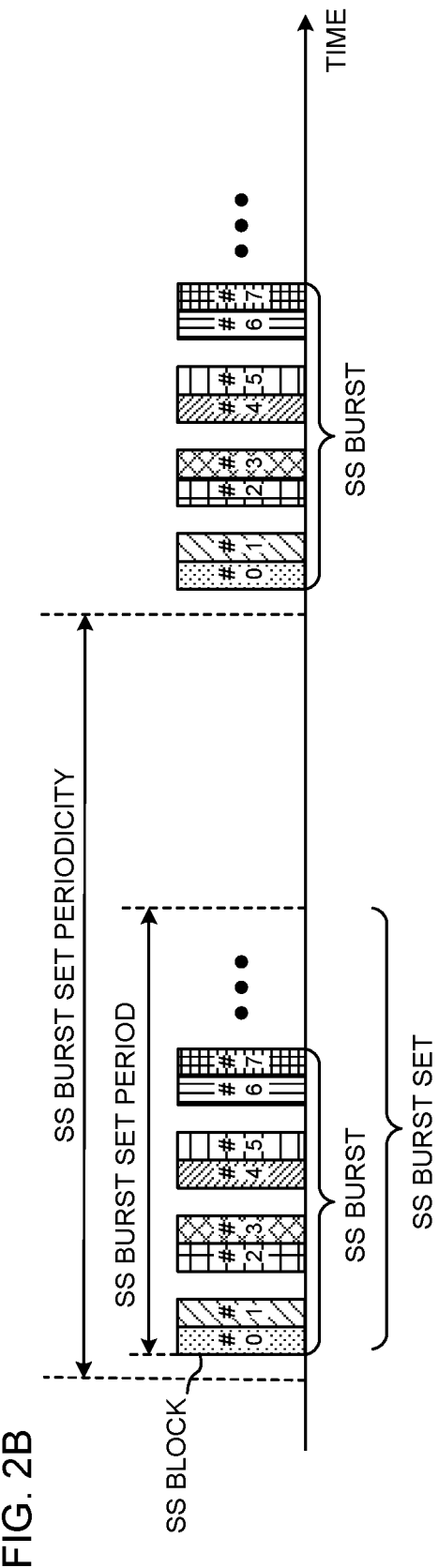

FIG. 2 is a diagram illustrating one example of an SS burst set. FIG. 2A illustrates one example of beam sweeping. As illustrated in FIGS. 2A and 2B, the radio base station (gNB) may temporarily differ (beam-sweep) beam directionality, and transmit different SS blocks by using different beams. In addition, although FIGS. 2A and 2B illustrate examples where multi-beams are used, it is also possible to transmit an SS block by using a single beam.

As illustrated in FIG. 2B, the SS burst includes one or more SS blocks, and the SS burst set includes one or more SS bursts. For example, in FIG. 2B, the SS burst includes eight SS blocks #0 to #7, yet is not limited to this. The SS blocks #0 to #7 may be transmitted by different beams #0 to #7 (FIG. 2A).

As illustrated in FIG. 2B, the SS burst set including the SS blocks #0 to #7 may be transmitted without passing a predetermined period (e.g., 5 ms or less that is also referred to as an SS burst set period). The SS burst set period changes according to the number of SS bursts (or SS blocks) in the SS burst set, and therefore may be paraphrased as the number of SS bursts (or SS blocks).

Furthermore, the SS burst set may be repeated at a predetermined periodicity (e.g., 5, 10, 20, 40, 80 or 160 ms that is also referred to as an SS burst set periodicity). A timing of the SS burst set (also referred to as an SS burst set timing) may be configured based on at least one of the SS burst period, the SS burst set periodicity and a predetermined offset value.

Each SS block in the SS burst set illustrated in FIG. 2B is identified based on predetermined identification information (SS block identification information). In this regard, the SS block identification information may be each index (SS block index) for uniquely identifying each SS block in the SS burst set. Alternatively, the SS block identification information may be a combination of the SS block index for uniquely identifying each SS block in the SS burst, and an index (SS burst index) for uniquely identifying each SS burst in the SS burst set. In addition, the SS burst index is common between the SS blocks in the same SS burst.

This SS block identification information is associated with each NR-PSS/SSS/PBCH. For example, the user terminal may assume that the NR-PSS/SSS/PBCH associated with the same SS block index is transmitted from an identical antenna port (by being applied the same beam or the same precoding). Furthermore, the SS block index may be associated with at least one of sequences of the NR-PSS/ SSS/PBCH and a mapping position (time and/or frequency resources).

It is assumed that there is also an SS block that is not actually transmitted in the above SS burst set. Hence, to efficiently perform measurement by using SS blocks, it is studied to transmit, to the user terminal, information (SS block transmission information) related to SS blocks that are actually transmitted in the SS burst set. The SS block transmission information may be, for example, information indicating time positions of the SS blocks that are actually transmitted among nominally configured time positions of the SS blocks.

By the way, the future radio communication system (e.g., 5G or NR) is assumed to include a plurality of cells whose at least one of a periodicity, a timing and a period (the number of SS bursts in the SS burst set or the number of SS blocks) of the SS burst set including the SS blocks that are actually transmitted is different.

Figure 3A:
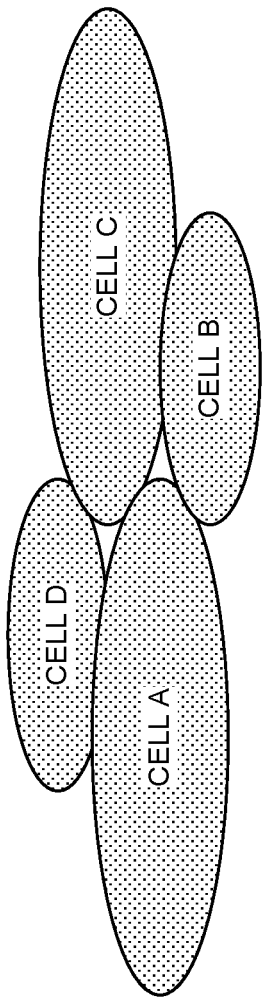
FIGS. 3A and 3B are diagrams illustrating one example of configurations of SS burst sets in a plurality of cells.

FIG. 3 is a diagram illustrating one example of configurations of SS burst sets in a plurality of cells. FIG. 3A illustrates a plurality of cells configured to the same carrier frequency (also referred to as a Component Carrier (CC) or a frequency band). For example, in FIG. 3A, cells A and C have larger coverages than cells B and D. In addition, at least part of the coverages of at least two of the cells A and B may overlap.

Figure 3B:
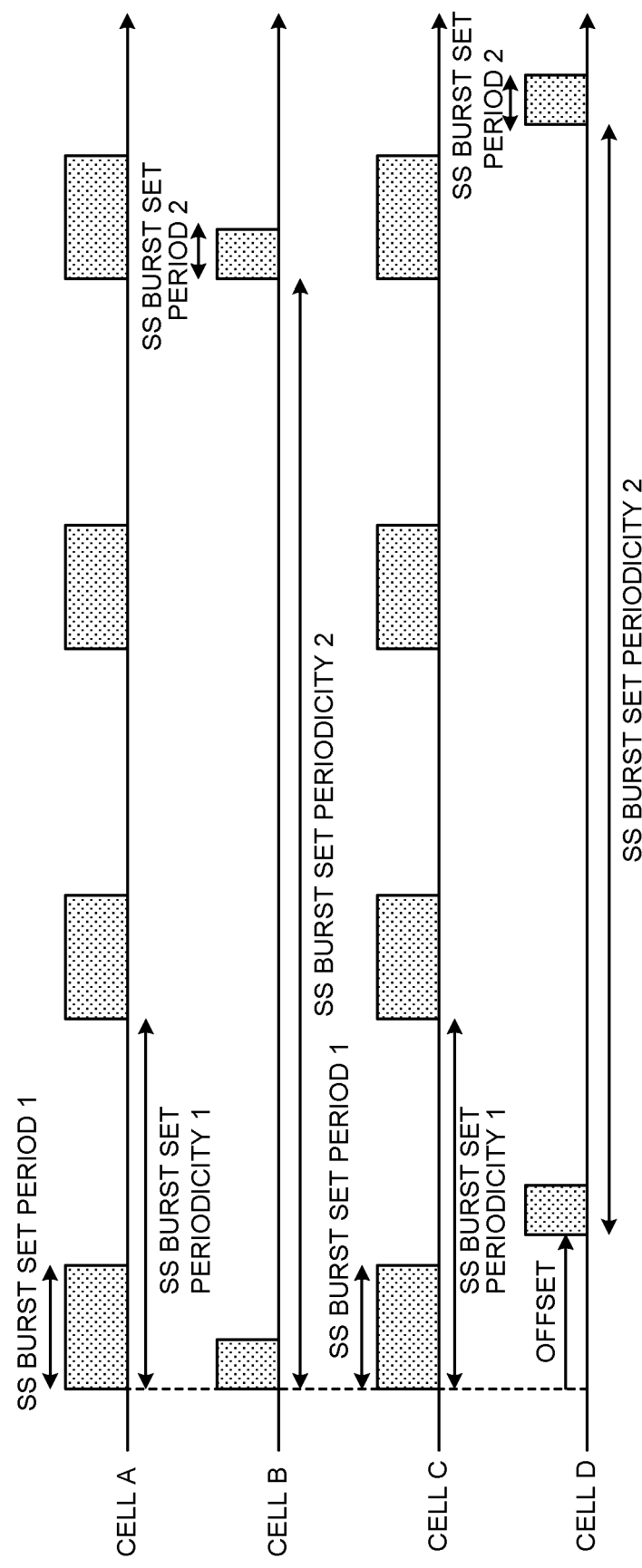

As illustrated in FIG. 3B, the periodicity of the SS burst set (SS burst set periodicity) including the SS blocks that are actually transmitted by each cell may be controlled based on the size of the coverage of each cell. For example, the cells A and C having the larger coverages than those of the cells B and D are assumed to support user terminals of relatively high moving speeds, and therefore SS burst set periodicities 1 may be configured shorter than SS burst set periodicities 2 of the cells B and D. On the other hand, the cells B and D are not assumed to support the user terminals of the high moving speeds, and therefore the SS burst set periodicities 2 may be configured longer than SS burst set periodicities 1 of the cells A and C.

Furthermore, as illustrated in FIG. 3B, the period of the SS burst set (SS burst set period) including the SS blocks that are actually transmitted by each cell may be controlled based on the number of beams beam-swept by each cell and/or the size of the coverage of each cell. For example, the cells A and C are assumed to perform beam-sweeping by using a larger number of beams than those of the cells B and D, and therefore SS burst set periods 1 may be configured longer than SS burst set periods 2 of the cells B and D.

Furthermore, as illustrated in FIG. 3B, a timing of the SS burst set (SS burst set timing) including the SS blocks that are actually transmitted by each cell may be controlled taking an inter-cell interference into account. For example, the SS burst set timing of the cell D may be obtained by adding a predetermined offset value to the SS burst set timing of the cell B.

Thus, it is assumed for the future radio communication system that at least one of the periodicity, the timing and the period of the SS burst set in which one or more SS blocks are actually transmitted is different between a plurality of cells of the same frequency carrier. In this case, a network (e.g., radio base station) is assumed to notify the user terminal of at least one of one or more SS burst set periodicities, one or more SS burst set periods and one or more SS burst set timings per frequency carrier.

However, when the SS blocks that are actually transmitted by one or more cells (one or more serving cells and/or one or more neighbor cells) are notified to enable the user terminal to efficiently perform measurement in the above future radio communication system, there is a risk that a processing load of the network side and/or a signaling overhead increase.

When, for example, the SS blocks that are actually transmitted by one or more serving cells and, in addition, one or more neighbor cells are notified to the user terminal to make measurement efficient, there is a risk that coordination becomes complicated between the neighbor cells and results in an increase in the processing load of the network side. Furthermore, when the SS blocks that are actually transmitted by the serving cells and the neighbor cells are notified, there is a risk of an increase in the signaling overhead.

Hence, the inventors of the present invention have studied an SS block transmission information transmission method that can suppress an increase in the processing load of the network side and/or the signaling overhead and realize efficient measurement of the user terminal.

Hereinafter, one embodiment of the present invention will be described in detail with reference to the drawings. Hereinafter, a case where the SS block indices are notified as SS block identification information will be described. However, when the SS block indices and the SS burst indices are notified as the SS block identification information, the following "SS block indices" can be replaced with the "SS block indices and/or the SS burst indices" and applied.

Furthermore, in the following description, "measurement" may mean measuring (obtaining) at least one of received power (e.g., RSRP), received quality (e.g., RSRQ or an SINR) and reception strength (e.g., RSSI) of a cell (a serving cell and/or a neighbor cell). Furthermore, the measurement may include at least one of, for example, RRM measurement, intra-frequency measurement), inter-frequency measurement and beam management.

Furthermore, in the following description, "the SS blocks that are (actually) transmitted by the serving cell and/or the neighbor cell" mean that at least part of the SS blocks including the same SS block index in different SS burst sets are transmitted (or are likely to be transmitted). Therefore, even when the SS block transmission information indicates the SS block index, it is also assumed that the SS block including this SS block index is not transmitted in part of the periodic SS burst set. [0043] (First Embodiment) According to the first embodiment, a user terminal receives SS block transmission information indicating SS blocks transmitted by a serving cell. Furthermore, the user terminal controls measurement of the serving cell based on the SS block transmission information.

In this regard, a measurement period is a period used for measurement (e.g., RRM measurement) by one or more cells (one or more serving cells and/or one or more neighbor cells). The measurement period may be the same periodicity, timing and period as those of an SS burst set of a predetermined periodicity nominally configured to one or more cells. Alternatively, the measurement period may overlap at least part of the SS burst set of the predetermined periodicity.

Furthermore, information (measurement period information) indicating the periodicity (measurement periodicity), the timing (measurement timing) and the period (measurement period) of the measurement period may be transmitted from a network (e.g., radio base station) to the user terminal by system information (e.g., RMSI: Remaining Minimum System Information) or higher layer signaling (e.g., RRC signaling). The measurement period information may be information indicating at least one of a nominal periodicity, timing and period of an SS burst set.

Furthermore, the SS block transmission information may be a list of SS block indices of SS blocks transmitted by one or more serving cells in at least part of the measurement period. Furthermore, the SS block transmission information may be used commonly between one or more serving cells, and the SS blocks indicated by the SS block transmission information only need to be transmitted by at least one of the serving cells. The SS block transmission information may be transmitted from the network (e.g., radio base station) to the user terminal by system information (e.g., RMSI) or higher layer signaling (e.g., RRC signaling).

Figure 4:
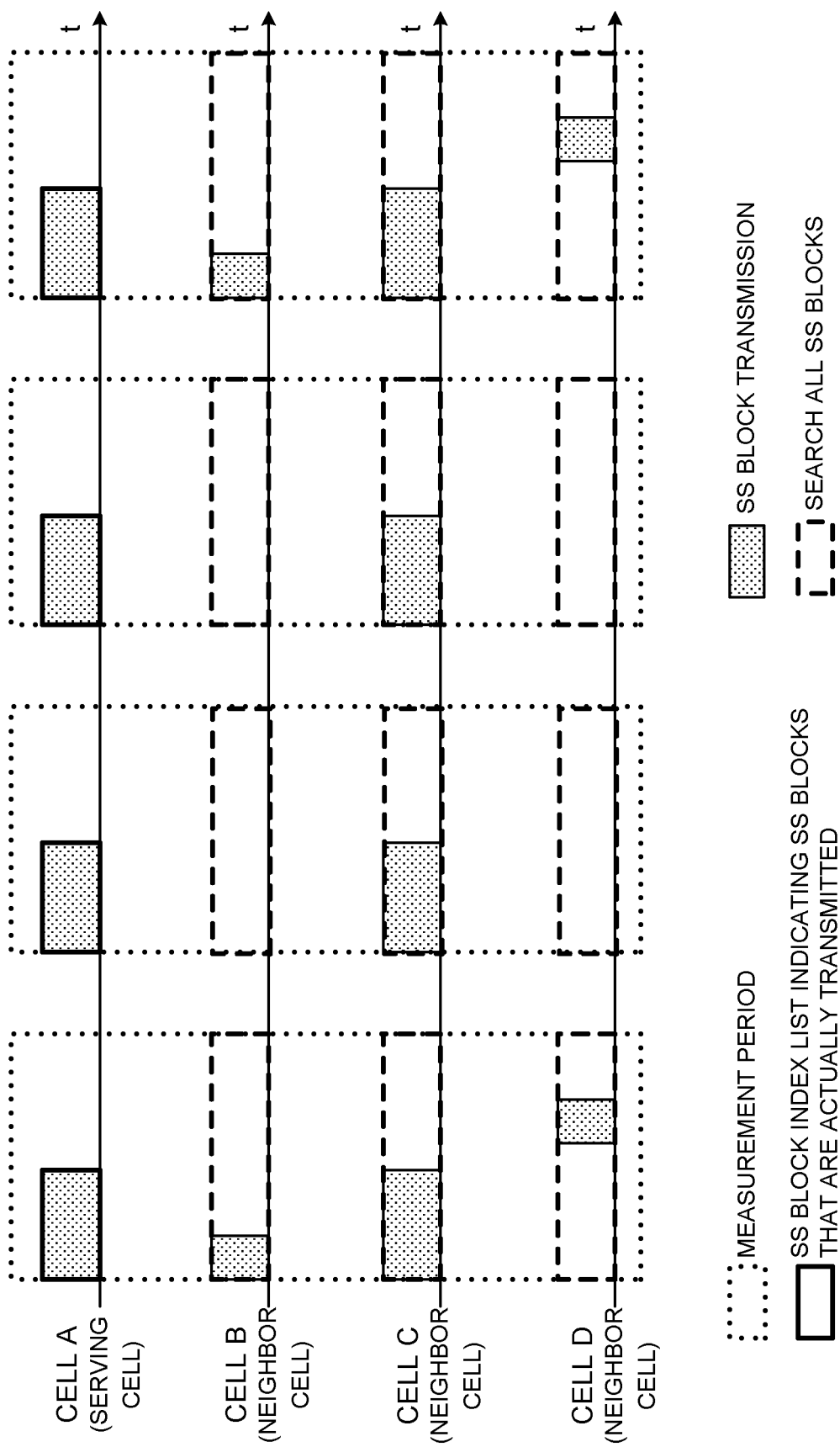
FIG. 4 is a diagram illustrating one example of measurement control according to a first embodiment.

FIG. 4 is a diagram illustrating one example of measurement control according to the first embodiment. In addition, in FIG. 4, a cell A is a serving cell of the user terminal, and cells B to D are neighbor cells of the user terminal. In addition, the number of serving cells may be one or more cells. Furthermore, FIG. 4 assumes that a measurement period of a predetermined periodicity is configured.

In FIG. 4, the user terminal receives a list indicating the SS block indices of the SS blocks that are actually transmitted by the serving cell A. For example, the list may include N SS block indices {#0, #1, . . . and #N−1}. In addition, the N SS block indices may not be contiguous, and only needs to be an SS block index of at least one SS block in an SS burst set.

Generally, when the user terminal performs measurement by using the SS blocks, (1) the user terminal searches an NR-PSS/SSS included in the SS block in the measurement period configured at a predetermined periodicity, and detects a measurement timing and a cell ID based on the NR-PSS/SSS. (2) The user terminal measures at least one of received power (e.g., RSRP), received quality (e.g., RSRQ) and reception strength (e.g., RSSI) of the SS block. (3) The user terminal blind-detects the SS block index of the SS block based on an NR-PBCH or a DMRS in the SS block.

In FIG. 4, the user terminal receives the list indicating the SS block indices of the SS blocks that are actually transmitted by the serving cell A. Therefore, for the serving cell A, the user terminal does not need to blind-detect all SS block indices in the entire measurement period of the predetermined periodicity, and performs measurement by using one or more SS blocks ({#0, #1, . . . and #N−1} that are actually transmitted by the serving cell A based on the above list. Thus, in FIG. 4, (3) it is possible to limit a blind detection target of the serving cell A based on the above list, and improve measurement efficiency.

On the other hand, for the neighbor cells B to D, the user terminal blind-detects all SS block indices in the above entire measurement period, detects the SS blocks that are transmitted in at least part of the measurement period, and performs measurement by using the detected SS blocks.

For example, the neighbor cells B and D in FIG. 4 do not actually transmit the SS blocks in part of the measurement period (e.g., second and third measurement periods from the left) that are repeated at predetermined periodicities. However, the user terminal needs to perform blind detection assuming all SS block indices including SS blocks, too, that are not actually transmitted in the period including the measurement period. Furthermore, the neighbor cells B to D in FIG. 4 transmit SS blocks in part of one measurement period. However, the user terminal cannot recognize the SS blocks in advance. Therefore, the user terminal needs to blind-detect all SS block indices in the one entire measurement period in the neighbor cells B to D.

In addition, the user terminal synchronizes with the serving cell A, and at least one of a radio frame timing, a slot timing in a radio frame and a symbol timing is known. Each SS block index is defined so as to be usable in a radio frame or at a specific timing in a predetermined period in a radio frame. When receiving the list indicating the SS block indices of the SS blocks that are actually transmitted by the serving cell A, the user terminal learns at which timing in the radio frame or in a predetermined period in the radio frame each SS block is transmitted. Consequently, for the serving cell A, (1) it is possible to limit a measurement timing in the measurement period, and improve measurement efficiency.

According to the first embodiment, SS block transmission information indicates SS blocks that are actually transmitted by a serving cell in at least part of a measurement period of a predetermined periodicity. Consequently, the user terminal can limit a blind detection range of SS block indices, and improve measurement efficiency of the serving cell.

Furthermore, according to the first embodiment, the SS block transmission information indicating the SS blocks that are actually transmitted by one or more neighbor cells is not transmitted. Consequently, it is not necessary to perform coordination between the neighbor cells, and suppress an increase in a processing load of a network side and/or a signaling overhead.

Second Embodiment

According to the second embodiment, a user terminal receives SS block transmission information indicating a range of SS blocks transmitted by one or more neighbor cells. The user terminal controls measurement of the neighbor cells based on the SS block transmission information. In addition, differences from the first embodiment will be mainly described below.

According to the second embodiment, the SS block transmission information may include information (range information) indicating a range of SS block indices of SS blocks transmitted by one or more neighbor cells in at least part of a measurement period of a predetermined periodicity. For example, the range information may be a minimum value and a maximum value of the SS block indices within the range. Alternatively, the range information may be index information for identifying a specific SS block index pattern defined by a specification. Furthermore, the SS block transmission information may include a list of SS block indices that are actually transmitted by one or more serving cells (first embodiment), and the range information.

Furthermore, the SS block transmission information may be shared between a plurality of neighbor cells. When the SS block transmission information is shared between a plurality of neighbor cells, an SS block within the range indicated by the SS block transmission information only needs to be transmitted by at least one of the neighbor cells.

Figure 5:
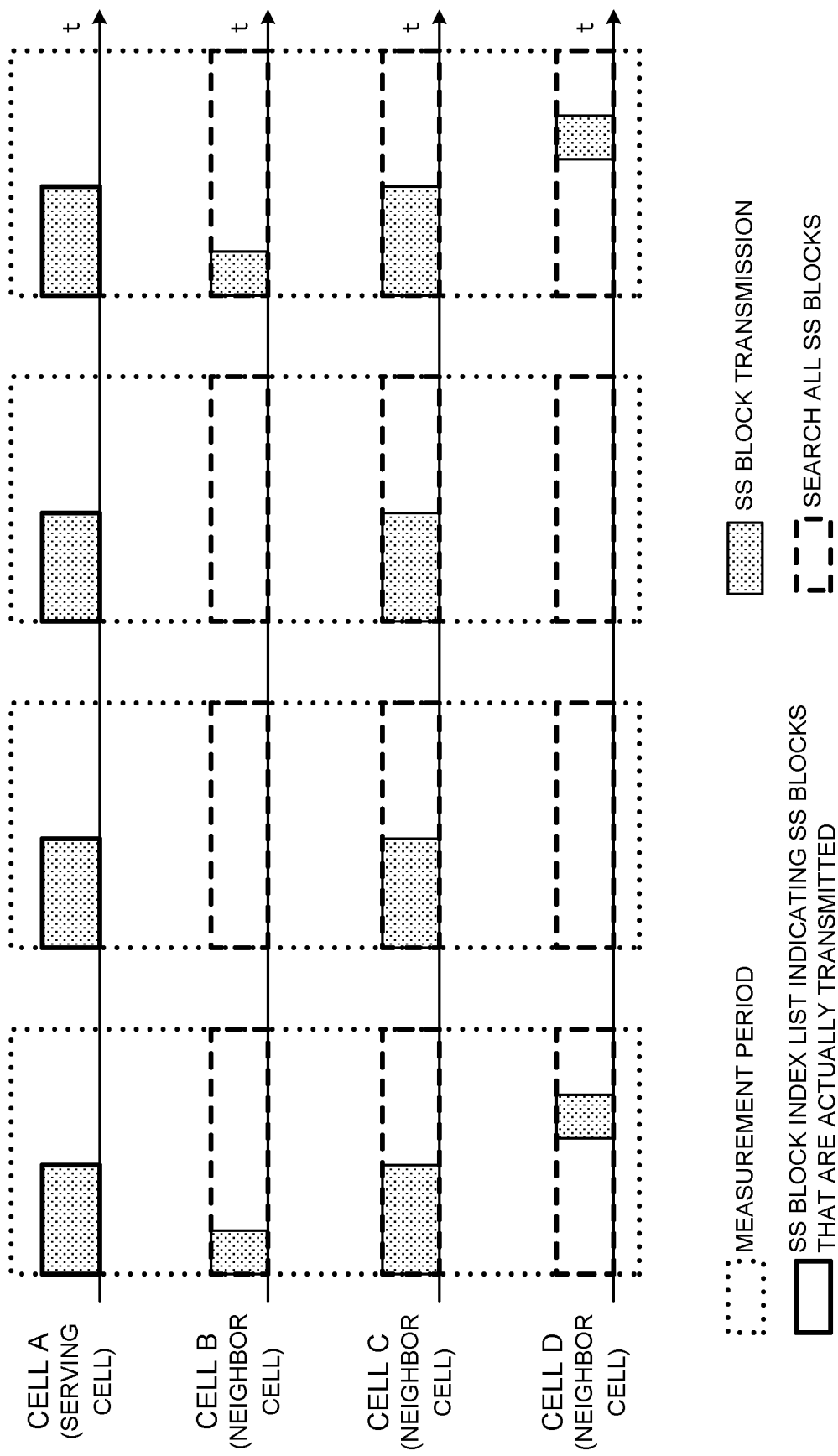
FIG. 5 is a diagram illustrating one example of measurement control according to a second embodiment.

FIG. 5 is a diagram illustrating one example of measurement control according to the second embodiment. FIG. 5 differs from FIG. 4 in that the SS block transmission information includes the list of the SS block indices of the SS blocks that are actually transmitted by a serving cell A, and, in addition, the range information indicating the range of the SS block indices of the SS blocks that are actually transmitted by one or more neighbor cells.

As described above, the above list may include NN SS block indices {#0, #1, . . . and #N−1} that are actually transmitted by the serving cell A. Furthermore, the range information indicates a range of M SS block indices {#0 to #M−1} including SS block indices of SS blocks that are actually transmitted by at least one of neighbor cells B to D, and may include a minimum value "0" and a maximum value "M−1" in the range. In addition, the range of the SS block indices only needs to include a predetermined number of SS block indices, and the minimum value of the range is not limited to 0.

Furthermore, in FIG. 5, while the neighbor cell C transmits at least one of the SS blocks #0 to #M−1 indicated by the above range information in part of measurement periods (e.g., second and third measurement periods from the left) that are repeated at a predetermined periodicity, the neighbor cells B and D do not transmit the SS blocks #0 to #M−1. Thus, the range information only needs to include an SS block that is transmitted by at least one of the neighbor cells B to D.

The user terminal performs measurement by using one or more SS blocks {#0, #1, . . . and #N−1} that are actually transmitted by the serving cell A in the measurement period based on the list. On the other hand, for the neighbor cells B to D, the user terminal blind-detects the SS blocks #0 to #M−1 indicated by the range information, and detects SS blocks that are actually transmitted within the range.

For example, although the neighbor cells B and D in FIG. 5 do not actually transmit SS blocks in part of measurement periods (e.g., second and third measurement periods from the left) that are repeated at a predetermined periodicity, the user terminal blind-detects the SS blocks #0 to #M−1 indicated by the above range information in the measurement period. Furthermore, although the neighbor cells B to D in FIG. 5 transmit the SS blocks in part of one measurement period, the user terminal can limit the blind detection range based on the above range information.

According to the second embodiment, the SS block transmission information indicates SS blocks that are actually transmitted by neighbor cells in at least part of a measurement period of a predetermined periodicity. Consequently, the user terminal can limit the blind detection range of SS block indices, and improve measurement efficiency of the neighbor cells.

Furthermore, when the serving cells and the neighbor cells are synchronized, and the user terminal recognizes a synchronized network, it is possible to assume that at least one of radio frame timings, slot timings in radio frames and symbol timings of the neighbor cells are known. In this case, according to SS block index information of SS blocks that are included in the SS block transmission information and are actually transmitted by the neighbor cells, it is possible to limit a measurement timing in the measurement period, and improve measurement efficiency.

Furthermore, according to the second embodiment, the SS block transmission information is shared between a plurality of neighbor cells, so that it is possible to suppress an increase in a processing load of a network side accompanying coordination between a plurality of neighbor cells, and/or an overhead accompanying signaling of the SS block transmission information.

Third Embodiment

According to the third embodiment, a user terminal receives SS block transmission information indicating a range of SS blocks transmitted by each group including one or more neighbor cells. The user terminal controls measurement of the neighbor cells per group based on the SS block transmission information. Differences from the first and/or second embodiments will be mainly described below.

According to the third embodiment, the SS block transmission information may include information (range information) indicating a range of SS block indices of SS blocks transmitted by each group including one or more neighbor cells in at least part of a measurement period of a predetermined periodicity. For example, range information of each group may be a minimum value and a maximum value of the SS block indices within the range. The minimum value and the maximum value may differ per group.

Furthermore, the range information of each group may be shared between one or more neighbor cells in a corresponding group. In this case, the SS blocks within the range indicated by the range information of each group only need to be transmitted by at least one neighbor cell in the corresponding group.

Furthermore, the SS block transmission information may include the list of SS block indices that are actually transmitted by one or more serving cells (first embodiment), and the range information of each group.

Figure 6:
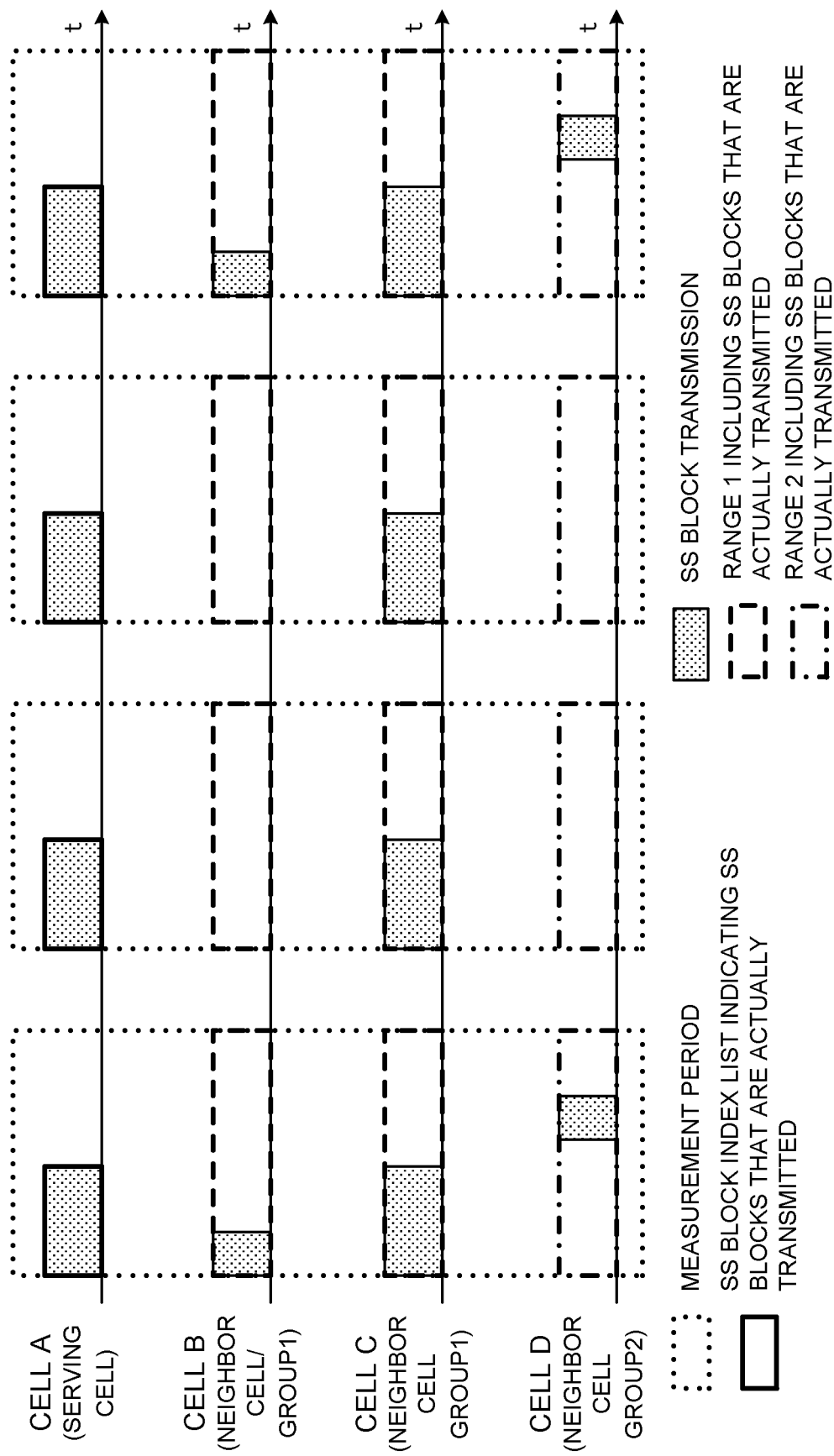
FIG. 6 is a diagram illustrating one example of measurement control according to a third embodiment.

FIG. 6 is a diagram illustrating one example of measurement control according to the third embodiment. FIG. 6 differs from FIG. 5 in receiving the above range information per group. For example, in FIG. 6, a group 1 including neighbor cells B and C and a group 2 including a neighbor cell D are formed.

As described above, the above list may include N SS block indices {#0, #1, . . . and #N−1} that are actually transmitted by a serving cell A. Furthermore, range information of the group 1 may indicate L SS block indices {#0 to #L−1} that are (likely to be) actually transmitted by at least one of the neighbor cells B and C. On the other hand, range information of the group 2 may indicate a predetermined number of SS block indices {#X and #Y} that are (likely to be) actually transmitted by the neighbor cell D.

Furthermore, in FIG. 6, although the neighbor cell C transmits at least one of the SS blocks #0 to #L−1 indicated by the range information of the group 1 in part of measurement periods (e.g., second and third measurement periods from the left) that are repeated at a predetermined periodicity, the neighbor cell B does not transmit the SS blocks #0 to #L−1. Thus, the range information of each group is shared in each group, and only needs to include SS blocks that are transmitted by at least one of the neighbor cells in each group.

The user terminal performs measurement by using one or more SS blocks {#0, #1, . . . and #N−1} that are actually transmitted by the serving cell A in the measurement period based on the above list. On the other hand, for the neighbor cells B and C, the user terminal blind-detects the SS blocks #0 to #L−1 indicated by the range information of the group 1, and detects the SS blocks that are actually transmitted within the range. Furthermore, for the neighbor cell D, the user terminal blind-detects the SS blocks #X and #Y indicated by the range information of the group 2, and detects the SS blocks that are actually transmitted within the range.

According to the third embodiment, SS block transmission information indicates SS blocks that are actually transmitted by the neighbor cells in each group in at least part of a measurement period of a predetermined periodicity. Consequently, the user terminal can limit a blind detection range of SS block indices, and improve measurement efficiency of the neighbor cells in each group.

Furthermore, according to the third embodiment, the SS block transmission information is shared between a plurality of neighbor cells in each group, so that it is possible to suppress an increase in a processing load of a network side accompanying coordination between a plurality of neighbor cells, and/or an overhead accompanying signaling of the SS block transmission information.

Fourth Embodiment

The fourth embodiment will describe a case where a plurality of measurement periods whose at least one of a periodicity, a timing and a period is different are configured. SS block transmission information (e.g., the above list and/or the above range information) described in the first to third embodiments may be associated with at least one of a plurality of measurement periods. A user terminal controls measurement in at least one of a plurality of measurement periods based on the SS block transmission information.

According to the fourth embodiment, the above range information may be associated with all neighbor cells of the same frequency carrier, may be associated with all listed neighbor cells or may be associated with all neighbor cells that are not listed. Furthermore, the user terminal may receive a plurality of pieces of measurement period information used to configure each of a plurality of measurement periods.

Figure 7:
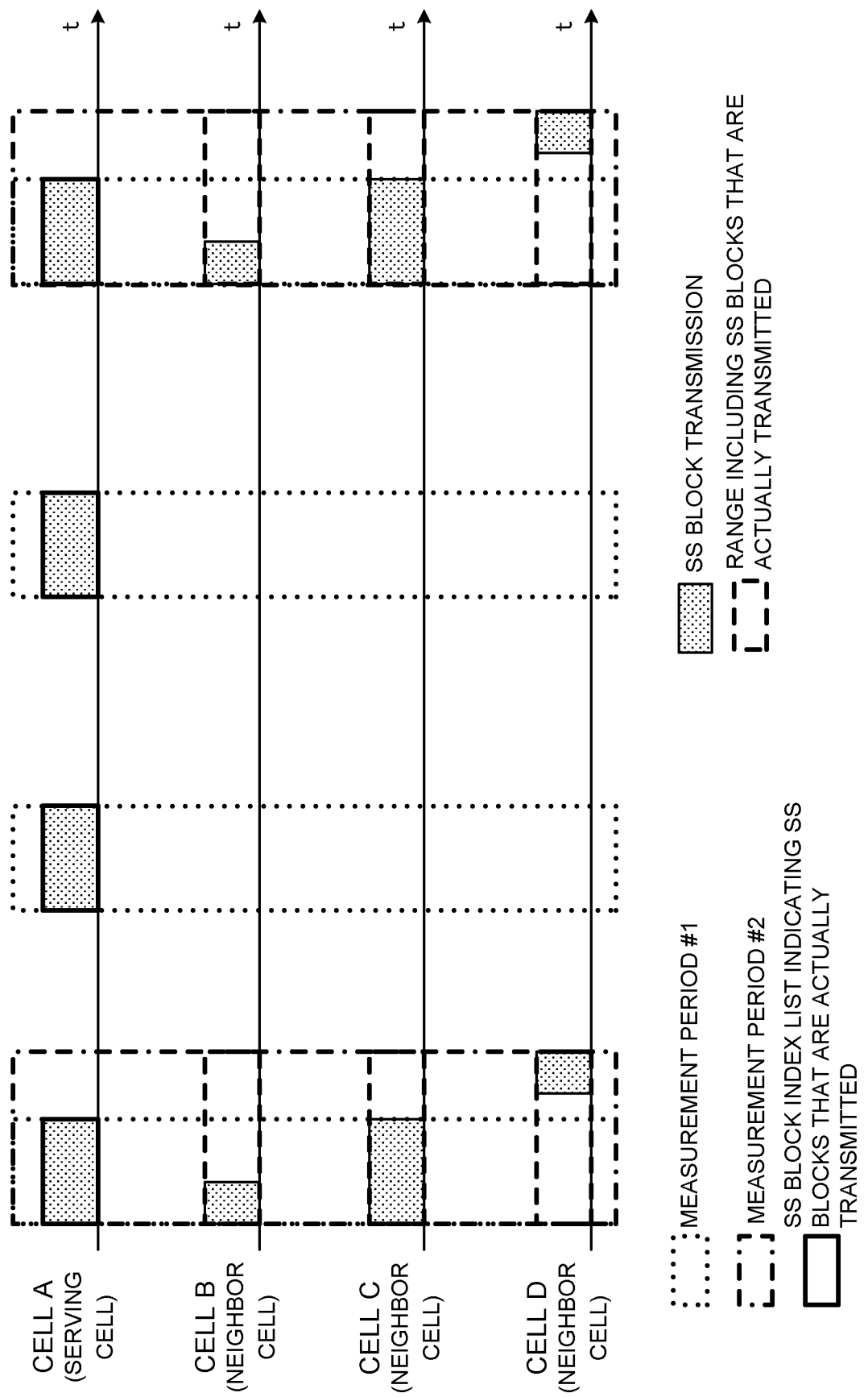
FIG. 7 is a diagram illustrating one example of measurement control according to a fourth embodiment.

FIG. 7 is a diagram illustrating one example of measurement control according to the fourth embodiment. FIG. 7 differs from FIGS. 4 to 6 in configuring a plurality of measurement periods to the user terminal. For example, in FIG. 7, the user terminal receives measurement period information #1 indicating at least one of a periodicity, a timing and a period of a measurement period #1, and measurement period information #2 indicating at least one of a periodicity, a timing and a period of a measurement period #2.

In FIG. 7, the user terminal configures the measurement periods #1 and #2 based on the measurement period information #1 and #2. The periodicity, the timing and the period of the measurement period #1 may be the same as the nominal periodicity, timing and period of an SS burst set of a serving cell A. Furthermore, the periodicity, the timing and the period of the measurement period #2 may be the same as nominal periodicities, timings and periods of SS burst sets of serving cells B to D.

For example, in FIG. 7, the periodicity of the measurement period #2 is longer than the periodicity of the measurement period #1. Furthermore, the period (time duration) of the measurement period #2 may be shorter than the period of the measurement period #1.

In FIG. 7, the measurement period #1 (or measurement period information #1) and SS block indices {#0, #1, . . . and #N−1} (or a list including the SS block indices) of SS blocks that are actually transmitted by the serving cell A. As illustrated in FIG. 7, at least part of (the entire period in FIG. 7) the measurement period #1 and the SS blocks transmitted by the serving cell A may overlap.

Furthermore, the measurement period #2 (or the measurement period information #2) and a range (or range information indicating the range) including SS blocks that are actually transmitted by the neighbor cells B to D are associated. As illustrated in FIG. 7, at least part (the entire period in FIG. 7) of the measurement period #2 and a predetermined period including the SS blocks transmitted by the neighbor cells B to D may overlap.

As described above, the SS block indices associated with the measurement period #1 may include N SS block indices {#0, #1, . . . and #N−1} that are actually transmitted by the serving cell A. Furthermore, for the neighbor cells B to D, the user terminal blind-detects SS blocks #0 to #M−1 indicated by the above range information, and detects the SS blocks that are actually transmitted within the range. The user terminal may measure the neighbor cells B to D by using the detected SS blocks.

In FIG. 7, the measurement period #1 and the SS block indices of SS blocks that are actually transmitted by the serving cell A are associated, so that it is possible to reduce a measurement load for using the SS blocks transmitted by the serving cell A in the measurement period #1. Furthermore, the measurement period #2 and a range including the SS blocks that are actually transmitted by at least one of the neighbor cells B to D are associated, so that it is possible to reduce a measurement load for using the SS blocks transmitted by the neighbor cells B to D in the measurement period #2.

According to the fourth embodiment, a plurality of measurement periods whose at least one of the periodicity, the timing and the period is different are configured, so that it is possible to prevent a decrease in measurement efficiency due to unnecessary blind detection by using a measurement period matching an SS block transmission frequency.

Other Embodiment

The second to fourth embodiments have described cases where SS block transmission information indicates a range of SS blocks transmitted by one or more neighbor cells. However, the SS block transmission information may indicate SS blocks transmitted by one or more neighbor cells. Furthermore, the SS block transmission information may be a list of SS block indices of SS blocks transmitted by one or more neighbor cells in at least part of a measurement period of a predetermined periodicity.

According to the other embodiment, the above list may be associated with all neighbor cells of the same frequency carrier, may be associated with all listed neighbor cells or may be associated with all neighbor cells that are not listed. When the above list is used, it is possible to suppress a load of blind detection of a user terminal in a measurement period compared to a case where range information is used.

(Radio Communication System)

The configuration of the radio communication system according to the present embodiment will be described below. This radio communication system uses one or a combination of each of the above embodiments of the present invention to perform communication.

Figure 8:
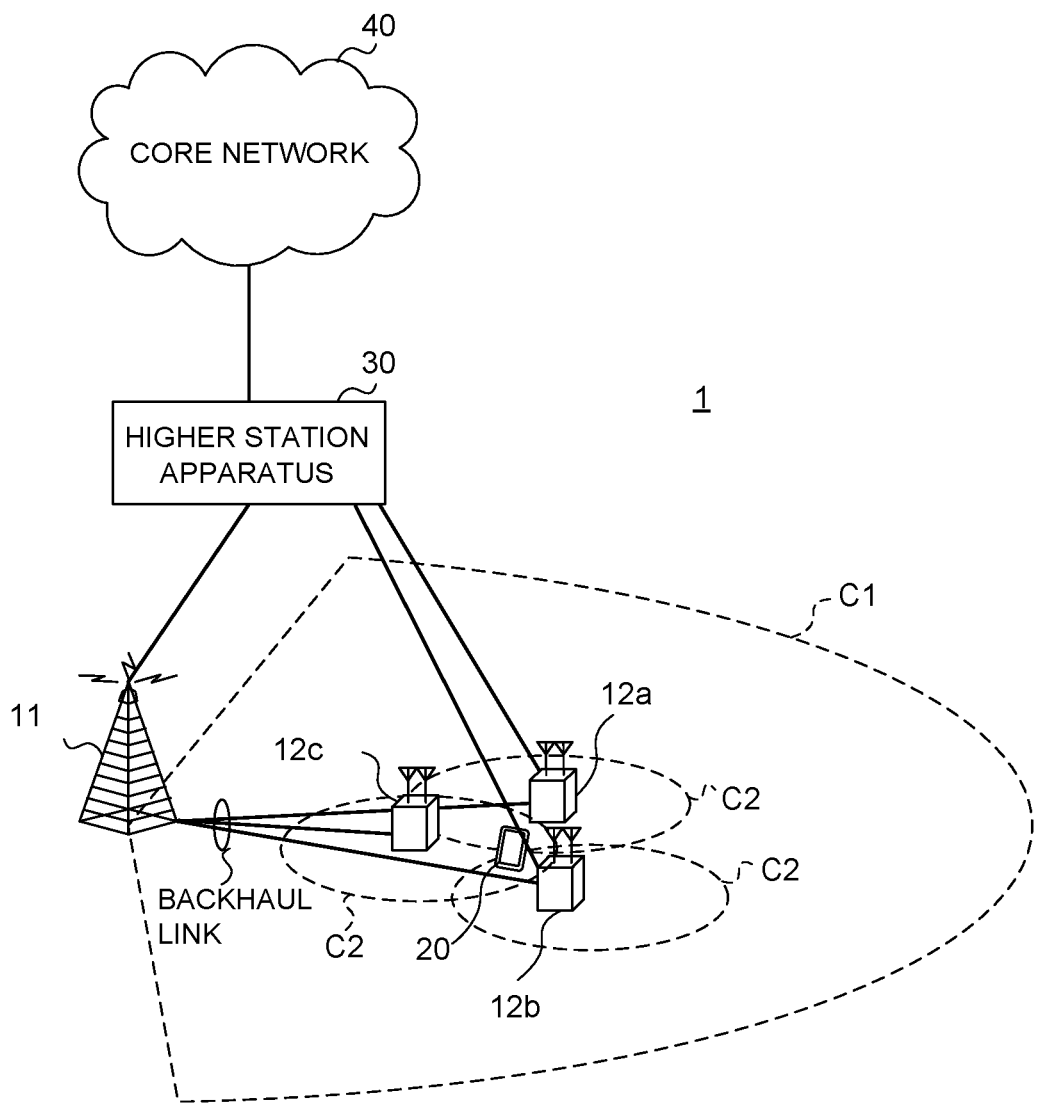
FIG. 8 is a diagram illustrating one example of a schematic configuration of a radio communication system according to the present embodiment.

FIG. 8 is a diagram illustrating one example of a schematic configuration of the radio communication system according to the present embodiment. A radio communication system 1 can apply Carrier Aggregation (CA) that aggregates a plurality of base frequency blocks (component carriers) whose one unit is a system bandwidth (e.g., 20 MHz) of the LTE system, and/or Dual Connectivity (DC).

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), New Radio Access Technology (New-RAT) or NR, or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more). For example, according to DC, an MeNB (MCG) employs an LTE cell, and an SeNB (SCG) employs an NR/5G-cell to perform communication.

The user terminal 20 and the radio base station 11 can communicate by using a carrier (an existing carrier that is also referred to as a Legacy carrier) of a narrow bandwidth in a relatively low frequency band (e.g., 2 GHz). Meanwhile, the user terminal 20 and each radio base station 12 may use a carrier of a wide bandwidth in a relatively high frequency band (e.g., 3.5 GHz or 5 GHz) or may use the same carrier as that used by the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are respectively connected with a higher station apparatus 30 and are connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an interference between the terminals. In this regard, uplink and downlink radio access schemes are not limited to a combination of these and may be other radio access schemes.

The radio communication system 1 uses as downlink channels a downlink shared channel (PDSCH: Physical Downlink Shared Channel) shared by each user terminal 20, a broadcast channel (a PBCH: Physical Broadcast Channel and an NR-PBCH) and a downlink L1/L2 control channel. At least one of user data, higher layer control information and System Information Blocks (SIB) is transmitted on the PDSCH. Furthermore, Master Information Blocks (MIB) are transmitted on the PBCH. A common control channel for notifying whether or not there is a paging channel is mapped on the downlink L1/L2 control channel (e.g., PDCCH), and data of the paging channel (PCH) is mapped on the PDSCH. A downlink reference signal, an uplink reference signal and a physical downlink synchronization signal are additionally arranged.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and the PUSCH is transmitted on the PDCCH. The number of OFDM symbols used for the PDCCH is transmitted on the PCFICH. Transmission acknowledgement information (also referred to as, for example, retransmission control information, HARQ-ACK or ACK/NACK) of a Hybrid Automatic Repeat reQuest (HARQ) for the PUSCH is transmitted on the PHICH. The EPDCCH is subjected to frequency division multiplexing with the PDSCH (downlink shared data channel) and is used to transmit DCI similar to the PDCCH.

The radio communication system 1 uses as uplink channels an uplink shared channel (PUSCH: Physical Uplink Shared Channel) shared by each user terminal 20, an uplink control channel (PUCCH: Physical Uplink Control Channel), and a random access channel (PRACH: Physical Random Access Channel). User data and/or higher layer control information are transmitted on the PUSCH. Furthermore, downlink radio quality information (CQI: Channel Quality Indicator) and transmission acknowledgement information are transmitted on the PUCCH. A random access preamble for establishing connection with cells is transmitted on the PRACH.

The radio communication system 1 transmits a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 transmits a Sounding Reference Signal (SRS) and a DeModulation Reference Signal (DMRS) as uplink reference signals. In this regard, the DMRS may be referred to as a user terminal specific reference signal (UE-specific Reference Signal). Furthermore, a reference signal to be transmitted is not limited to these.

<Radio Base Station>

Figure 9:
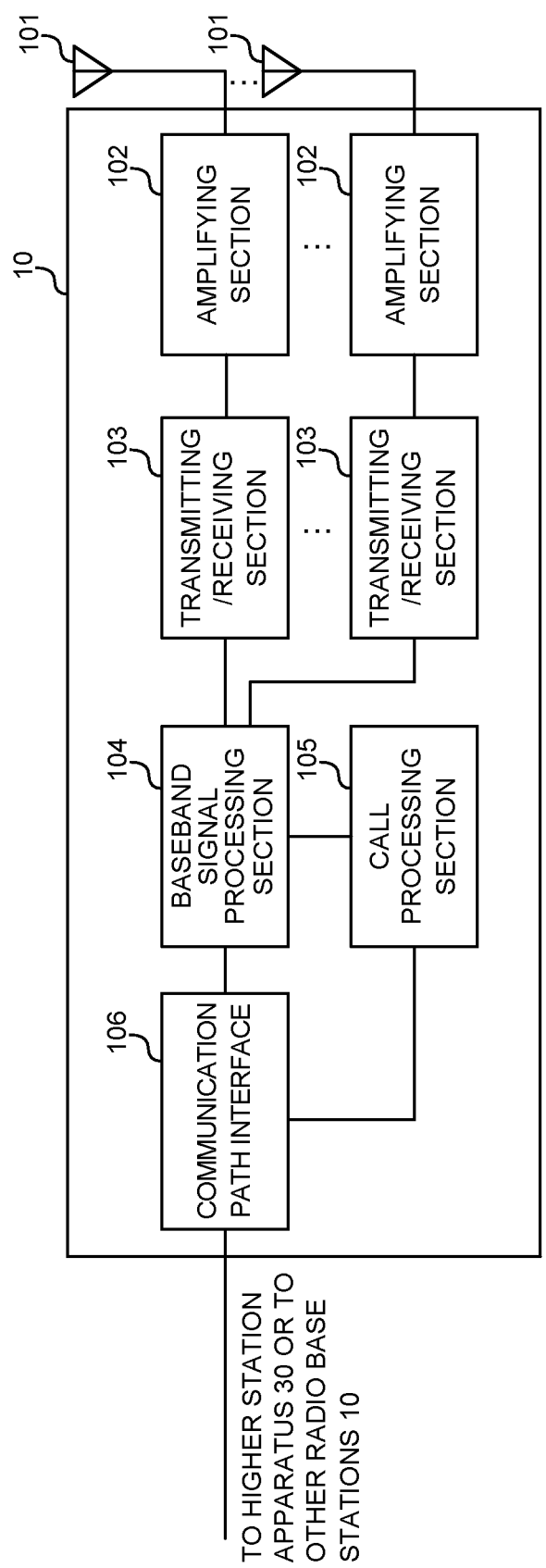
FIG. 9 is a diagram illustrating one example of an entire configuration of a radio base station according to the present embodiment.

FIG. 9 is a diagram illustrating one example of an entire configuration of the radio base station according to the present embodiment. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of an RLC layer such as Radio Link Control (RLC) retransmission control, Medium Access Control (MAC) retransmission control (such as HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and/or inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal as an uplink signal received by each transmission/reception antenna 101. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the channel interface 106. The call processing section 105 performs call processing such as a configuration and release of a communication channel, state management of the radio base station 10, and radio resource management.

The channel interface 106 transmits and receives signals to and from the higher station apparatus 30 via a predetermined interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

In addition, each transmission/reception section 103 transmits a Synchronization Signal (SS) block. Furthermore, each transmission/reception section 103 transmits SS block transmission information. Furthermore, each transmission/reception section 103 may transmit one or more pieces of measurement period information.

Figure 10:
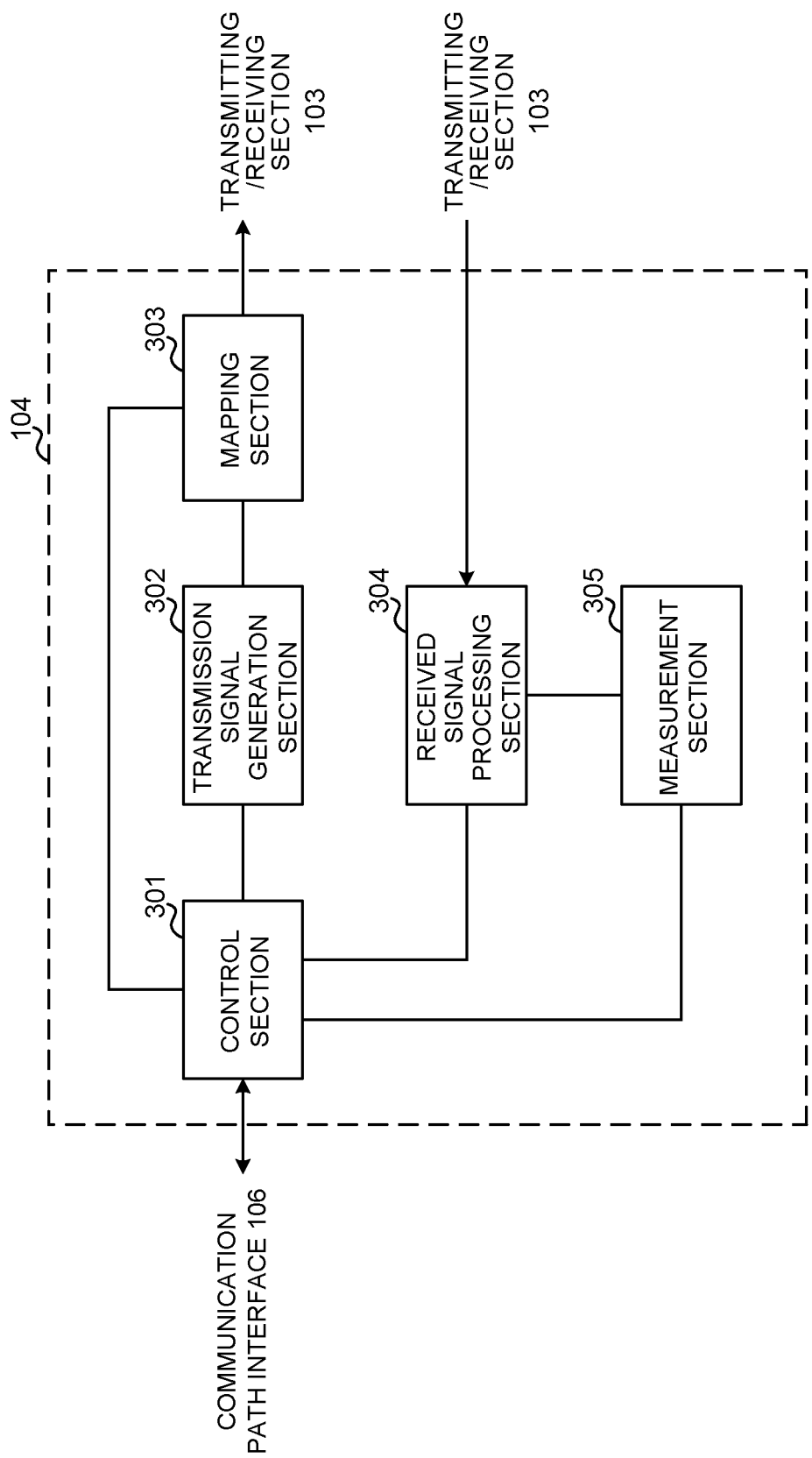
FIG. 10 is a diagram illustrating one example of a function configuration of the radio base station according to the present embodiment.

FIG. 10 is a diagram illustrating one example of a function configuration of the radio base station according to the present embodiment. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components do not necessarily need to be included in the baseband signal processing section 104. The baseband signal processing section 104 includes a digital beam forming function that provides digital beam forming.

The control section (scheduler) 301 controls the entire radio base station 10. The control section 301 can be composed of a controller, a control circuit or a control apparatus described based on the common knowledge in the technical field according to the present invention.

The control section 301 controls at least one of, for example, signal (including a synchronization signal, an MIB, a paging channel, system information and a broadcast channel) generation of the transmission signal generating section 302, and signal allocation of the mapping section 303.

The control section 301 controls generation and transmission of an SS block including the synchronization signal and the broadcast channel (NR-PBCH). Furthermore, the control section 301 controls generation and/or mapping of a sequence of a DMRS (DMRS sequence) multiplexed on an NR-PBCH symbol.

Furthermore, the control section 301 controls generation and transmission of SS block transmission information related to SS blocks transmitted by one or more serving cells and/or one or more neighbor cells. The SS block transmission information may indicate the SS blocks transmitted by the serving cells in at least part of a measurement period of a predetermined periodicity (first embodiment).

Furthermore, the SS block transmission information may indicate the SS blocks or a range of the SS blocks transmitted by one or more neighbor cells in at least part of the measurement period of the predetermined periodicity (the second embodiment and other embodiment).

Furthermore, the SS block transmission information may indicate the SS blocks or the range of the SS blocks transmitted by each group including one or more neighbor cells in at least part of the measurement period of the predetermined periodicity.

Furthermore, the control section 301 controls generation and transmission of the measurement period information indicating the measurement period of the user terminal 20. Furthermore, the control section 301 may control generation and transmission of a plurality of pieces of measurement period information indicating a plurality of measurement periods, respectively, whose at least one of a periodicity, a timing and a period is different. Furthermore, the SS block transmission information may be associated with at least one of the above plurality of measurement periods.

The transmission signal generating section 302 generates downlink signals (such as at least one of a downlink control signal, a downlink data signal, a downlink reference signal and an SS block) based on an instruction from the control section 301, and outputs the downlink signals to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink signal allocation information, and a UL grant for notifying uplink signal allocation information based on the instruction from the control section 301. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on a predetermined radio resource based on the instruction from the control section 301, and outputs the downlink signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal and an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure, for example, received power (e.g., Reference Signal Received Power (RSRP)), received quality (e.g., Reference Signal Received Quality (RSRQ)), a Signal to Interference plus Noise Ratio (SINR)) and/or a channel state of the received signal. The measurement section 305 may output a measurement result to the control section 301.

<User Terminal>

Figure 11:
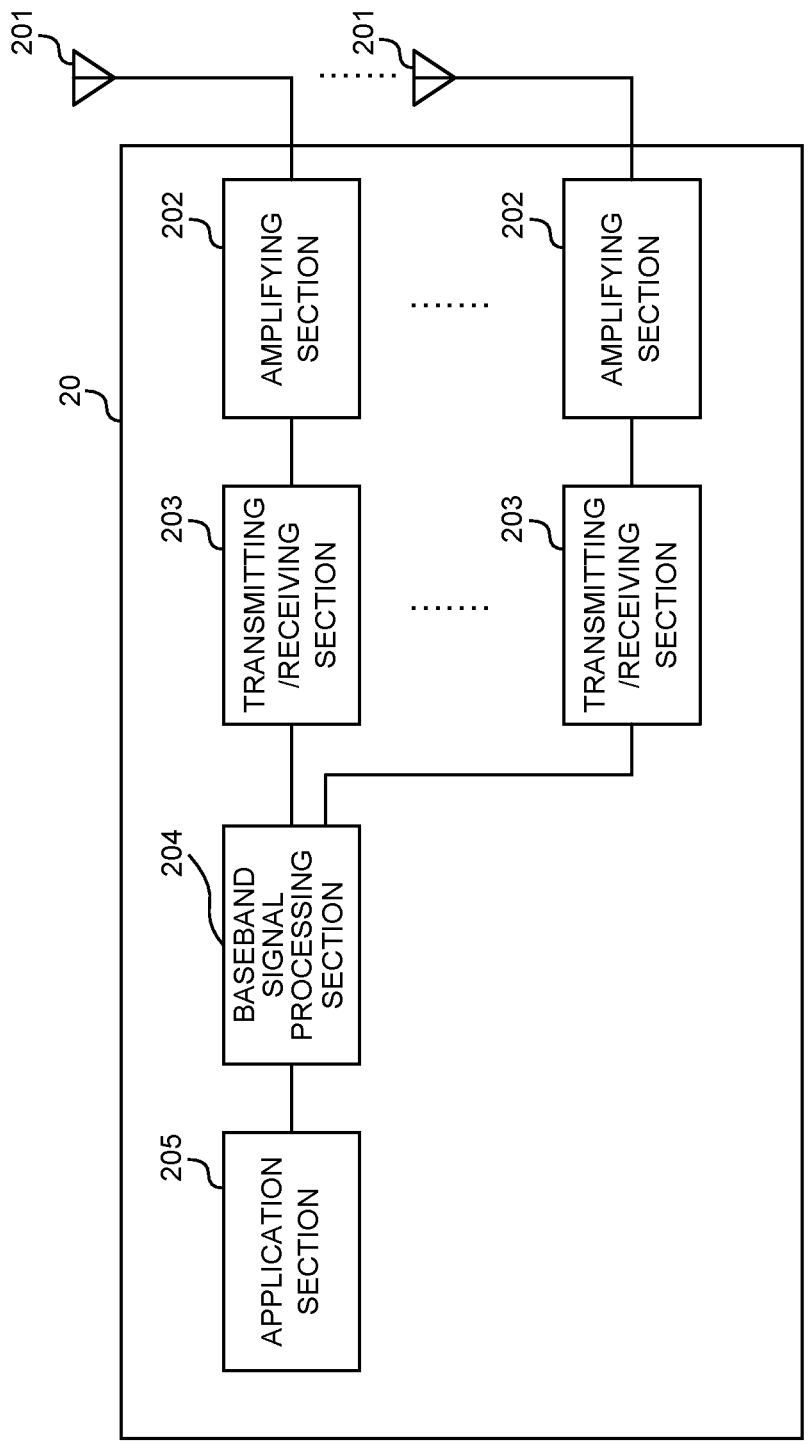
FIG. 11 is a diagram illustrating one example of an entire configuration of a user terminal according to the present embodiment.

FIG. 11 is a diagram illustrating one example of an entire configuration of the user terminal according to the present embodiment. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs at least one of FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information, too, among the downlink data to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmission/reception section 203. Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

In addition, each transmission/reception section 203 may further include an analog beam forming section that performs analog beam forming. The analog beam forming section can be composed of an analog beam forming circuit (e.g., a phase shifter or a phase shift circuit) or an analog beam forming apparatus (e.g., a phase shifter) described based on the common knowledge in the technical field according to the present invention. Furthermore, each transmission/reception antenna 201 can be composed of an array antenna, for example.

In addition, each transmission/reception section 203 receives an SS block. Furthermore, each transmission/reception section 203 receives SS block transmission information. Furthermore, each transmission/reception section 203 may receive one or more pieces of measurement period information. For example, each transmission/reception section 203 may receive the SS block information and/or the one or more pieces of measurement period information by using system information (e.g., RMSI) or higher layer signaling (e.g., RRC signaling).

Figure 12:
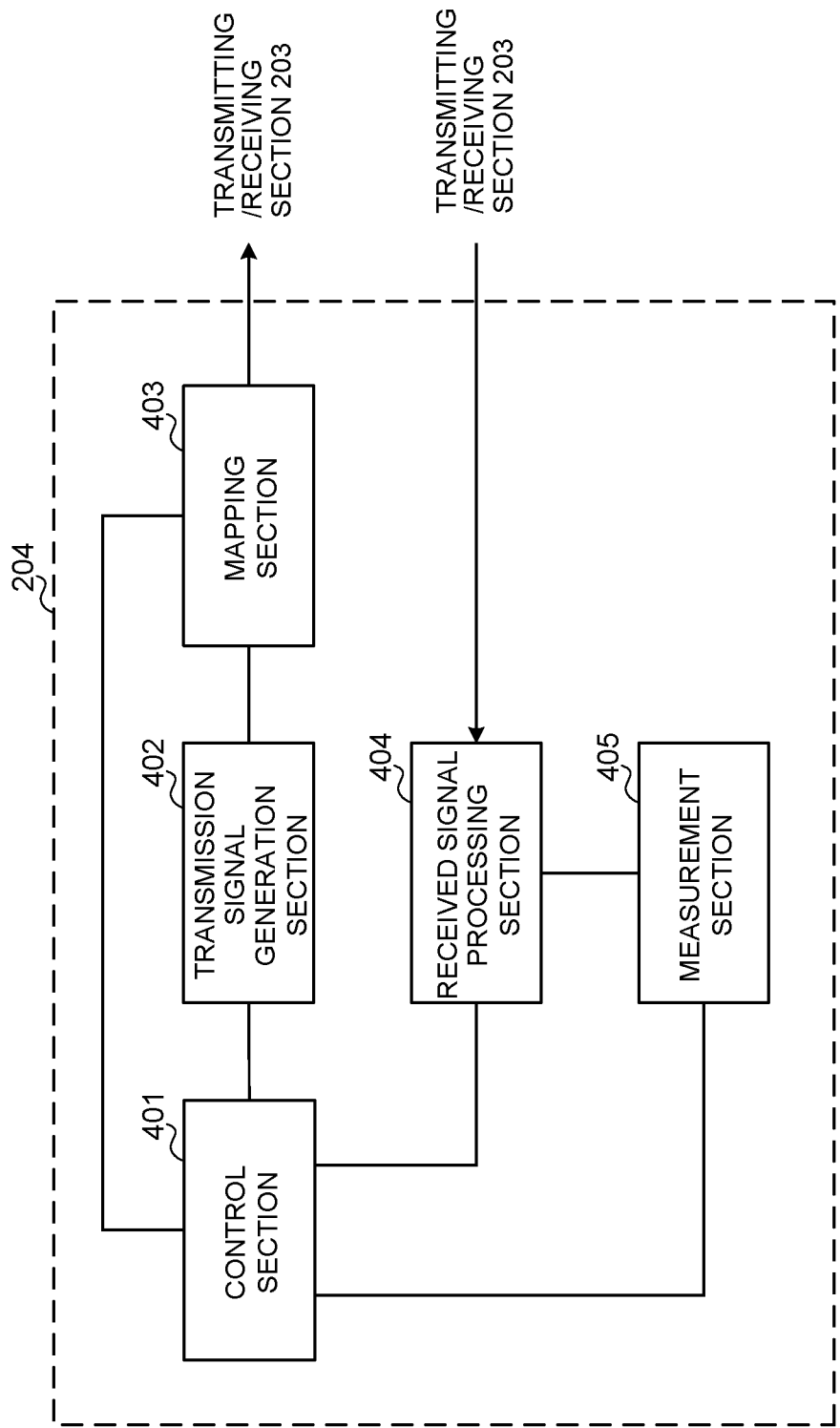
FIG. 12 is a diagram illustrating one example of a function configuration of the user terminal according to the present embodiment.

FIG. 12 is a diagram illustrating one example of a function configuration of the user terminal according to the present embodiment. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components do not necessarily need to be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 performs control to receive SS blocks at a predetermined frequency band or more. Furthermore, the control section 401 may control reception of the synchronization signal blocks assuming that the synchronization signal blocks are arranged in a predetermined domain of a slot.

Furthermore, the control section 401 controls measurement of one or more serving cells and/or one or more neighbor cells. More specifically, the control section 401 may control measurement of the serving cells in a measurement period of a predetermined periodicity based on SS block transmission information indicating SS blocks transmitted by the serving cells (first embodiment).

Furthermore, the control section 401 may control measurement of neighbor cells in the measurement period of the predetermined periodicity based on the SS block transmission information indicating the SS blocks or a range of the SS blocks transmitted by one or more neighbor cells (second embodiment).

Furthermore, the control section 401 may control measurement of neighbor cells in each group in the measurement period of the predetermined periodicity based on the SS block transmission information indicating the SS blocks or a range of the SS blocks transmitted by each group including one or more neighbor cells (third embodiment).

Furthermore, when a plurality of measurement periods whose at least one of a periodicity, a timing and a period is different are configured, the control section 401 may control measurement in at least one of a plurality of measurement periods. In this case, the SS block transmission information may be associated with at least one of a plurality of measurement periods (fourth embodiment).

Furthermore, the control section 401 may control a configuration of one or more measurement periods based on measurement period information from the radio base station 10. More specifically, the control section 401 may control the configuration of a plurality of measurement periods whose at least one of a periodicity, a timing and a period is different (fourth embodiment).

Furthermore, the control section 401 may control the configuration of one or more measurement periods based on the above measurement period information. Furthermore, the control section 401 may control blind detection (detection of SS blocks that are actually transmitted) in a measurement period of one or more serving cells and/or one or more neighbor cells based on the above SS block transmission information.

The transmission signal generating section 402 generates an uplink signal (such as an uplink control signal, an uplink data signal and an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and/or Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on a radio resource based on the instruction from the control section 401, and outputs the uplink signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmission/reception section 203. In this regard, the received signal is, for example, a downlink signal (a downlink control signal, a downlink data signal and a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 receives a synchronization signal and a broadcast channel transmitted by the radio base station by applying beam forming based on an instruction from the control section 401. Particularly, the received signal processing section 404 receives the synchronization signal and the broadcast channel allocated to at least one of a plurality of time domains (e.g., symbols) that compose a predetermined transmission time interval (e.g., a subframe or a slot).

The received signal processing section 404 outputs information decoded by reception processing to the control section 401. The received signal processing section 404 outputs, for example, broadcast information, system information, RRC signaling and DCI to the control section 401. Furthermore, the received signal processing section 404 outputs a received signal and a signal after the reception processing to the measurement section 405.

The measurement section 405 performs measurement related to the received signal. For example, the measurement section 405 may measure one or more serving cells and/or one or more neighbor cells by using SS blocks transmitted from the radio base station 10. The measurement section 405 can be composed of a measurement instrument, a measurement circuit or a measurement apparatus described based on the common knowledge in the technical field according to the present invention.

The measurement section 405 may measure received power (e.g., RSRP), received quality (e.g., RSRQ or a received SINR) and/or a channel state by using, for example, the received SS blocks. The measurement section 405 may output a measurement result to the control section 401. For example, the measurement section 405 performs RRM measurement using a synchronization signal.

<Hardware Configuration>

In addition, the block diagrams used to describe the above embodiments illustrate blocks in function units. These function blocks (components) are realized by an optional combination of hardware and/or software. Furthermore, means for realizing each function block is not limited in particular. That is, each function block may be realized by one physically and/or logically coupled apparatus or may be realized by a plurality of apparatuses formed by connecting two or more physically and/or logically separate apparatuses directly and/or indirectly (by way of, for example, wired connection or radio connection).

Figure 13:
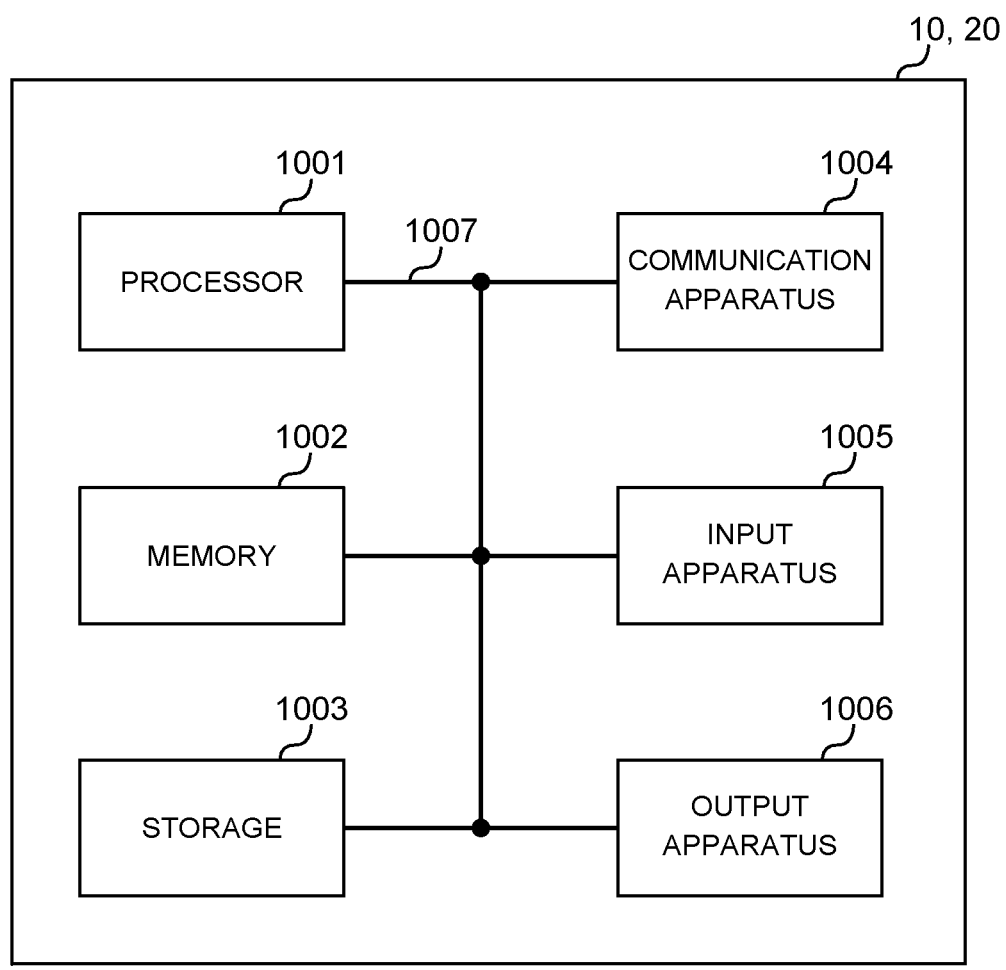
FIG. 13 is a diagram illustrating one example of hardware configurations of the radio base station and the user terminal according to the present embodiment.

For example, the radio base station and the user terminal according to the present embodiment may function as computers that perform processing of the radio communication method according to the present invention. FIG. 13 is a diagram illustrating one example of hardware configurations of the radio base station and the user terminal according to the present embodiment. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 13 or may be configured without including part of the apparatuses.

For example, FIG. 13 illustrates the only one processor 1001. However, there may be a plurality of processors. Furthermore, processing may be executed by one processor or may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read predetermined software (program), and thereby causing the processor 1001 to perform an arithmetic operation, and control at least one of communication of the communication apparatus 1004 and reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an arithmetic operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiments are used. For example, the control section 401 of the user terminal 20 may be realized by a control program stored in the memory 1002 and operating on the processor 1001 or other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus illustrated in FIG. 13 is connected by the bus 1007 that communicates information. The bus 1007 may be composed of a single bus or may be composed of buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA).

The hardware may realize part or all of each function block. For example, the processor 1001 may be implemented by at least one of these types of hardware.

Modified Example

In addition, each term that is described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of periods (frames) in a time domain. Each of one or a plurality of periods (frames) that composes a radio frame may be referred to as a subframe. Furthermore, the subframe may include one or a plurality of slots in the time domain. The subframe may be a fixed time duration (e.g., 1 ms) that does not depend on the numerology.

Furthermore, the slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerology. Furthermore, the slot may include a plurality of mini slots. Each mini slot may include one or a plurality of symbols in the time domain.

All of the radio frame, the subframe, the slot, the mini slot and the symbol indicate time units for transmitting signals. The other corresponding names of the radio frame, the subframe, the slot, the mini slot and the symbol may be used. For example, one subframe may be referred to as a Transmission Time Interval (TTI), a plurality of contiguous subframes may be referred to as TTIs, or one slot or one mini slot may be referred to as a TTI. That is, the subframe and/or the TTI may be a subframe (1 ms) according to existing LTE, may be a period (e.g., 1 to 13 symbols) shorter than 1 ms or may be a period longer than 1 ms.

In this regard, the TTI refers to, for example, a minimum time unit of scheduling for radio communication. For example, in the LTE system, the radio base station performs scheduling for allocating radio resources (a frequency bandwidth and/or transmission power that can be used by each user terminal) in TTI units to each user terminal. In this regard, a definition of the TTI is not limited to this. The TTI may be a transmission time unit of a data packet (transport block) subjected to channel coding, or may be a processing unit of scheduling and/or link adaptation. In addition, when one slot or one mini slot is referred to as a TTI, one or more TTIs (i.e., one or more slots or one or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe or a short subframe.

Resource Blocks (RBs) are resource allocation units of the time domain and the frequency domain, and may include one or a plurality of contiguous sub carriers in the frequency domain. Furthermore, the RB may include one or a plurality of symbols in the time domain or may have the length of one slot, one mini slot, one subframe or one TTI. One TTI or one subframe may be composed of one or a plurality of resource blocks. In this regard, the RB may be referred to as a Physical Resource Block (PRB: Physical RB), a PRB pair or an RB pair.

Furthermore, the resource block may be composed of one or a plurality of Resource Elements (REs). For example, one RE may be a radio resource domain of one subcarrier and one symbol.

In this regard, structures of the above radio frame, subframe, slot, mini slot and symbol are only exemplary structures. For example, configurations such as the number of subframes included in a radio frame, the number of slots included in a subframe or a radio frame, the number of mini slots included in a slot, the numbers of symbols included in a slot or a mini slot, the number of subcarriers included in an RB, the number of symbols in a TTI, a symbol length and a Cyclic Prefix (CP) length can be variously changed.

Furthermore, the information and parameters described in this description may be expressed by absolute values, may be expressed by relative values with respect to predetermined values or may be expressed by other corresponding information. For example, a radio resource may be indicated by a predetermined index. Furthermore, numerical expressions that use these parameters may be different from those explicitly disclosed in this description.

Names used for parameters in this description are by no means restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are by no means restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by a management table. The input and output information and signals can be overwritten, updated or additionally written. The output information and signals may be deleted. The input information and signals may be transmitted to other apparatuses.

Notification of information is not limited to the aspects/embodiments described in this description and may be performed by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIB) and System Information Blocks (SIB)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by, for example, an MAC Control Element (MAC CE).

Furthermore, notification of predetermined information (e.g., notification of "being X") may be made not only explicitly but also implicitly (by, for example, not notifying this predetermined information or by notifying another information). Decision may be performed based on a value (0 or 1) expressed by one bit, may be performed based on a boolean expressed by true or false or may be performed by comparing numerical values (e.g., comparison with a predetermined value).

Irrespectively of whether software is referred to as software, firmware, middleware, a microcode or a hardware description language or as other names, the software should be widely interpreted to mean an instruction, an instruction set, a code, a code segment, a program code, a program, a subprogram, a software module, an application, a software application, a software package, a routine, a subroutine, an object, an executable file, an execution thread, a procedure or a function.

Furthermore, software, instructions and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provides communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and/or "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, specific operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" "calculating", "computing", "processing", "deriving", "investigating", "looking up" (e.g., looking up in a table, a database or another data structure) and "ascertaining". Furthermore, "deciding (determining)" may be regarded to "decide (determine)" "receiving" (e.g., receiving information), "transmitting" (e.g., transmitting information), "input", "output" and "accessing" (e.g., accessing data in a memory). Furthermore, "deciding (determining)" may be regarded to "decide (determine)" "resolving", "selecting", "choosing", "establishing" and "comparing". That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. It can be understood that, when used in this description, the two elements are "connected" or "coupled" with each other by using one or more electric wires, cables and/or printed electrical connection, and by using electromagnetic energy having wavelengths in radio frequency domains, microwave domains and (both of visible and invisible) light domains in some non-restrictive and incomprehensive examples.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above, yet it is obvious for a person skilled in the art that the present invention is not limited to the embodiments described in this description. The present invention can be carried out as modified and changed aspects without departing from the gist and the scope of the present invention defined by the recitation of the claims. Accordingly, the disclosure of this description intends for exemplary explanation, and does not have any restrictive meaning to the present invention.

The invention claimed is:

1. A terminal comprising:
a receiver that receives information indicating a range of indexes, each of which indicates a mapping time domain position on resources, of synchronization signal (SS) blocks for measurement in a measurement duration of a predetermined periodicity, the SS blocks being transmitted by one or more neighbor cells or by each group including one or more neighbor cells; and
a processor that measures, using at least one of the SS blocks indicated by the information, at least one of a reference signal received power (RSRP), a reference signal received quality (RSRQ), and a signal to interference plus noise ratio (SINR),
wherein if a plurality of measurement durations having different periodicities are configured, then the information is associated with at least one of the plurality of measurement durations, and
the measurement durations have different periodicities including a first periodicity and a second periodicity, the first periodicity of the measurement durations indicated with a predetermined offset value by a higher layer signaling and the second periodicity of the measurement durations that is shorter than the first periodicity of the measurement durations.

2. The terminal according to claim 1, wherein the information indicates at least one of the SS blocks that is transmitted in one or more cells, indicated by a list.

3. The terminal according to claim 2, wherein the receiver receives the information by using higher layer signaling.

4. The terminal according to claim 2, wherein at least one of the SS block is transmitted on a first frequency band or on a second frequency band that is higher in frequency than the first frequency band.

5. The terminal according to claim 1, wherein the receiver receives the information by using higher layer signaling.

6. The terminal according to claim 5, wherein at least one of the SS block is transmitted on a first frequency band or on a second frequency band that is higher in frequency than the first frequency band.

7. The terminal according to claim 1, wherein at least one of the SS blocks is transmitted on a first frequency band or on a second frequency band that is higher in frequency than the first frequency band.

8. The terminal according to claim 1, wherein the information includes information for identifying a specific pattern of SS block.

9. A radio communication method, for a terminal, comprising:
receiving information indicating a range of indexes, each of which indicates a mapping time domain position on resources, of synchronization signal (SS) blocks for measurement in a measurement duration of a predetermined periodicity, the SS blocks being transmitted by one or more neighbor cells or by each group including one or more neighbor cells; and
measuring, using at least one of the SS blocks indicated by the information, at least one of a reference signal received power (RSRP), a reference signal received quality (RSRQ), and a signal to interference plus noise ratio (SINR),
wherein if a plurality of measurement durations having different periodicities are configured, then the information is associated with at least one of the plurality of measurement durations, and
the measurement durations have different periodicities including a first periodicity and a second periodicity, the first periodicity of the measurement durations indicated with a predetermined offset value by a higher layer signaling and the second periodicity of the measurement durations that is shorter than the first periodicity of the measurement durations.

10. A radio communication system comprising:
a base station comprising:
a transmitter that transmits information indicating a range of indexes, each of which indicates a mapping time domain position on resources, of synchronization signal (SS) blocks for measurement in a measurement duration of a predetermined periodicity, the SS blocks being transmitted by one or more neighbor cells or by each group including one or more neighbor cells; and
a terminal comprising:
a receiver that receives the information; and
a processor that measures, using at least one of the SS blocks indicated by the information, at least one of a reference signal received power (RSRP), a reference signal received quality (RSRQ), and a signal to interference plus noise ratio (SINR),
wherein if a plurality of measurement durations having different periodicities are configured, then the information is associated with at least one of the plurality of measurement durations, and
the measurement durations have different periodicities including a first periodicity and a second periodicity, the first periodicity of the measurement durations indicated with a predetermined offset value by a higher layer signaling and the second periodicity of the measurement durations that is shorter than the first periodicity of the measurement durations.

\* \* \* \* \*